United States Patent [19]
Radlof

[11] Patent Number: 4,676,491
[45] Date of Patent: Jun. 30, 1987

[54] STORABLE WORK STAND

[76] Inventor: George Radlof, 118 Boundbrook Rd., Middlesex, N.J. 08846

[21] Appl. No.: 763,672

[22] Filed: Aug. 8, 1985

[51] Int. Cl.⁴ .......... B23Q 1/04
[52] U.S. Cl. .......... 269/69; 269/88; 269/296; 269/901
[58] Field of Search .......... 182/151, 182, 184; 269/296, 17, 69, 283, 88, 901, 45

[56] References Cited

U.S. PATENT DOCUMENTS

| | | | |
|---|---|---|---|
| 947,426 | 1/1910 | Fees | 269/296 |
| 1,556,882 | 10/1925 | Weaver | 269/296 |
| 2,312,914 | 3/1943 | Koszeghy | 269/296 |
| 2,410,330 | 10/1946 | Ashenfelter | 182/184 |
| 2,908,403 | 10/1959 | Browder et al. | 269/296 |
| 3,181,858 | 5/1965 | Daniels | 269/296 |
| 4,254,946 | 3/1981 | Kerr et al. | 269/296 |
| 4,457,399 | 7/1984 | Breisch | 182/151 |

FOREIGN PATENT DOCUMENTS

| | | | |
|---|---|---|---|
| 520780 | 12/1953 | Belgium | 182/182 |

*Primary Examiner*—Robert C. Watson
*Attorney, Agent, or Firm*—Ronald G. Goebel

[57] ABSTRACT

The invention provides a support stand for a workpiece which is stable, height adjustable and easily storable when not in use. The stand includes a platform section having a flat platform member and a tubular member mounted under the platform member. A first inner cylindrical leg having holes disposed at intervals along the length thereof is mounted under the platform member. A first outer cylindrical leg is slidably mounted over the first inner cylindrical leg having a hole located at the top for communication with any of the first holes of the inner leg. A T-shaped member comprising a second outer cylindrical leg is slidably mounted over the second inner cylindrical leg and has third holes disposed at intervals along its length and fifth holes located at the top 90° from the third holes. Pin means are employed for locking the first inner leg to the first outer leg and the second inner leg to the first outer leg and the second inner leg to the second outer leg. The horizontal section of the T-shaped member can be rotated to a position coplanar with the platform section and locked in the position by the pin means. A cylindrical sleeve having a clamp is also mounted on the platform section. A tubular upright section is slidably fitted in the sleeve, the tubular upright section being storable within the tubular member. The apparatus further includes an accessory for the upright section which includes a cylindrical support member releasably mounted in the upright member, a clamp mounted on the support member at one and and end a hook mounted on the support member at the other end.

2 Claims, 7 Drawing Figures

STORABLE WORK STAND

BACKGROUND OF THE INVENTION

This invention is concerned with a portable and storable stand or support for holding a workpiece, particularly an automobile body part.

Automobile body repairs and painting, as presently conducted, often involve the removal of a part such as a quarter panel, fender, bumper or the like for replacement or repair. In the case of a repair the part may require straightening, alteration, additions, taping, sanding and painting. Many automobile shapes employ saw horses or makeshift supports to hold the part during repair which do not allow proper positioning of the piece, or involve holding apparatus such as clamps which get in the way during painting or simply do not hold the part steadily. Moreover such supports are not collapsible or storable on a wall and often occupy the valuable space needed in a body shop.

The present invention, on the other hand, provides a stand for supporting a workpiece which is stable, height adjustable, capable of holding the piece without clamps and easily storable on a wall when not in use.

SUMMARY OF THE INVENTION

The invention provides a portable and storable stand for supporting a workpiece such as an automobile body part which comprises a platform member having a tubular member mounted therebelow supported by inner and outer leg asemblies which are height adjustable. One assembly includes an inner cylindrical leg having height adjusting holes spaced at intervals along its length. An outer cylindrical leg fits slidably over the inner cylindrical leg and has a top hole which can communicate with any of the height adjusting holes in the inner cylindrical leg. A pin is inserted through aligned holes to lock the legs together at the desired height. The other leg assembly includes a second inner cylindrical leg having height adjustment holes and slidably fittable thereover is an outer cylindrical leg portion of a T-shaped member. Such T-shaped member has a horizontal section which rests on the floor perpendicular to the plane of the platform member. Since at least three points not in a straight line are defined by the first outer legs and the horizontal section of the T-shaped member resting on the floor the stand maintains a stable position. Moreover, having one outer cylindrical leg without a horizontal section removes the danger of tripping and access to the stand. A first hole in the outer cylindrical leg portion can be aligned with any of the height adjusting holes in the second inner cylindrical leg and the legs can be locked together at the desired height by means of a pin inserted through the holes. A second hole is also located in the outer cylindrical leg portion 90° from the first hole. When the stand is to be stored the pin is removed and the T-shaped member rotated 90° so that the second hole aligns with the top adjustment hole in the inner cylindrical leg. This causes the horizontal section to be positioned in the same place as the platform member. The platform member has mounted thereon a sleeve having a screw clamp though which is slidably disposed a cylindrical upright member. The upright member can be adjusted to the height desired and then secured in place inside the sleeve by the clamp. A cushioned ball may be inserted in the top of the upright member. The cylindrical upright member can be unclamped from the sleeve and stored inside the tubular member under the platform member.

The stand can be used in pairs to support a large workpiece. An accessory piece may also be inserted in the cylindrical upright member. The accessory piece comprises a tubular shaft insertable in the upright member and a crosspiece having mounted thereon a clamp and a hook for grasping and holding a workpiece. In the stored position, the clamp of the accessory is secured to the sleeve and extends downwardly. When disassembled the stand can be hung on a wall.

DETAILED DESCRIPTION OF THE PREFERRED EMBODIMENTS

Figure 1:
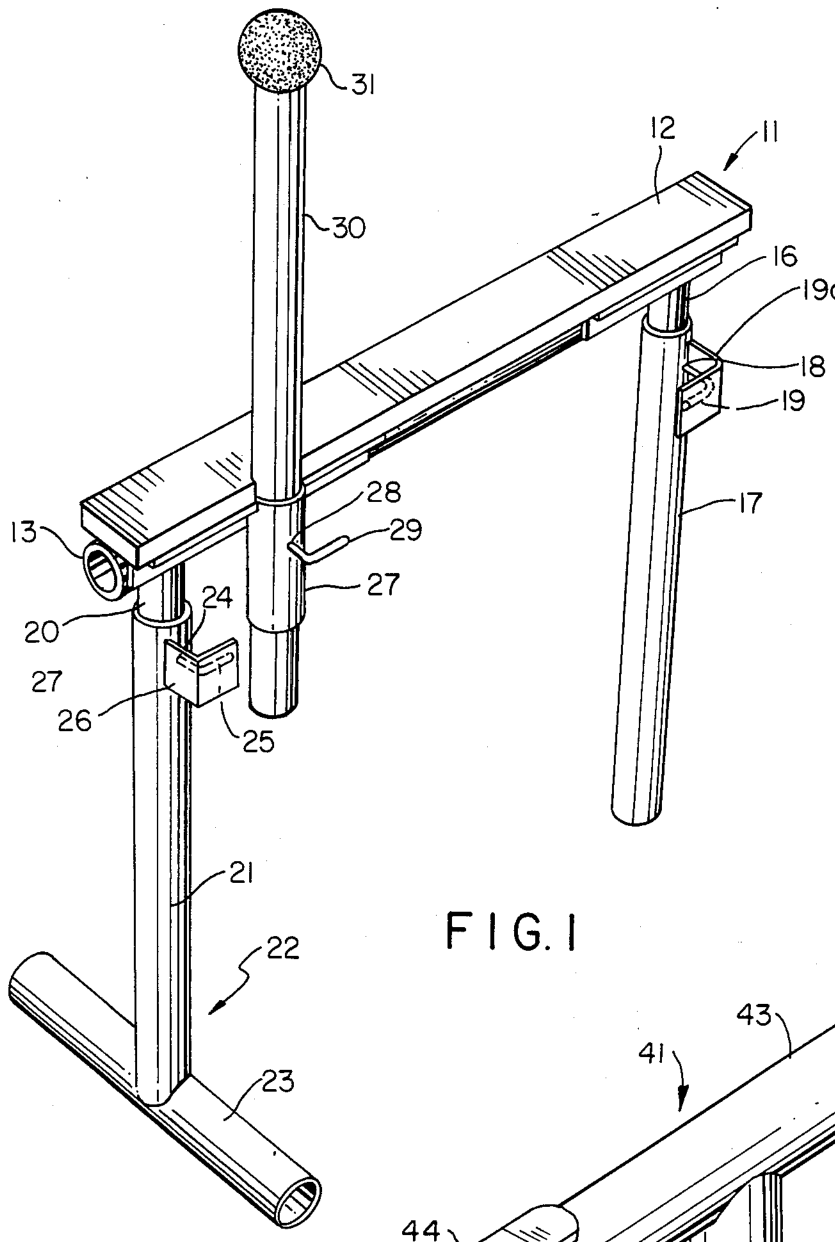
FIG. 1 shows a perspective view of a portable stand according to the invention.
Figure 6:
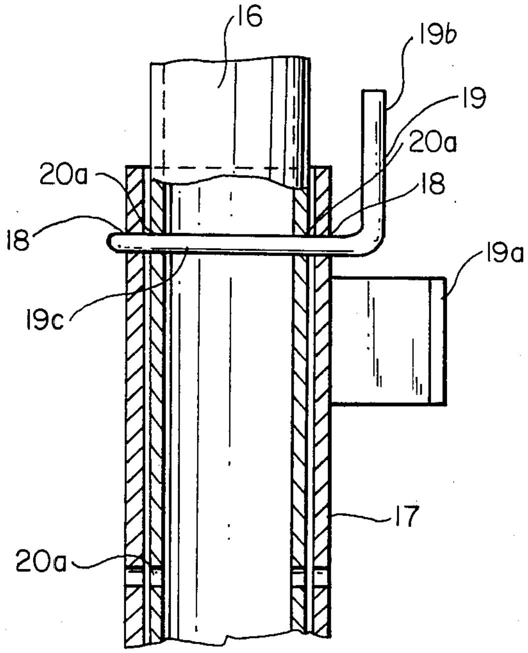
FIGS. 6 and 7 show angled pin locking means for the legs of the stand.
Figure 7:
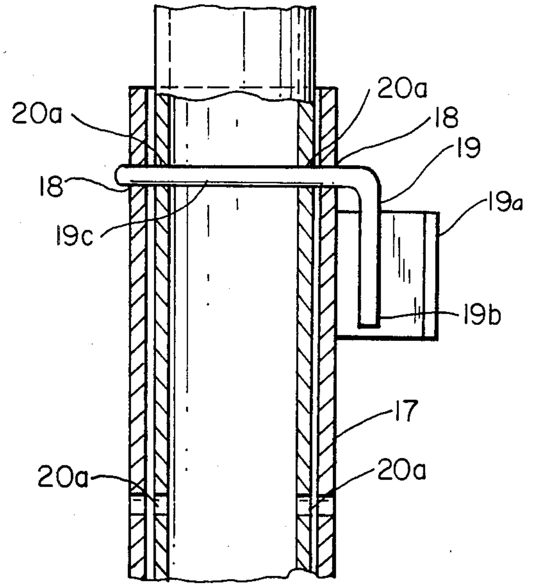

Referring to the drawings and particularly to FIGS. 1, 2, 3 and 5 there is shown a portable and storable stand according to the invention in its assembled condition. As shown in FIG. 1 the stand consists of a platform section shown generally by 11 having platform member 12 and tube member 13 mounted thereunder. The platform member 12 can be comprised of wood for example and is secured to angle bracket 14 by means of bolts 15. The bracket 14 is in turn welded to the tube member 13 at sides 14*a* of the bracket. Extending vertically at one end of the platform section is inner cylindrical leg 16. Leg 16 is slidably mounted inside outer cylindrical leg 17 which rests on the floor. At the top of leg 17 is adjustment hole 18 which passes through the sides of the leg into which is inserted angled pin 19. There are holes 20*a* in the inner cylindrical leg 16 which can be matched with the holes in the outer leg 17 as shown in FIGS. 6 and 7. Guard 19*a* protects the user or his clothing from injury by contact with the pin. Referring particularly to FIGS. 6 and 7 there is shown the manner of locking the inner and outer cylindrical legs using angled pin 19. In FIG. 6 the pin shaft 19*c* is inserted through the aligned holes 18 and 20*a* of the outer and inner cylindrical legs, respectively with the free end 19*b* extending upwardly above guard 19*a*. In FIG. 7, the free end 19*b* of the pin is turned downwardly into the space enclosed by guard 19*a*. There are additional holes 20*a* located in inner cylindrical leg 16 along its length as shown in FIGS. 6 and 7. Inner cylindrical leg 16 can thus be adjusted vertically inside outer cylindrical leg 17 to increase or decrease the height of that end of the platform section and is locked by inserting the pin 19 through holes 18 and any of holes 20*a* in leg 16.

Extending vertically at the outer end of the platform section is inner cylindrical leg 20 which is slidably mounted inside outer cylindrical leg section 21 of a T-shaped member shown generally as 22. Horizontal section 23 of T-shaped member rests on the floor. By not providing outer cylindrical leg 17 with a horizontal section there is at least partially eliminated the danger of tripping or standing on the leg. Inner cylindrical leg section 20 as in the case of inner cylindrical leg 16 can be adjusted vertically inside outer cylindrical leg section 21 of the T-shaped member to increase or decrease the height of that end of the platform section. At the top of leg section 21 is hole 24 passing through the walls thereof (one shown) into which can be inserted angled pin 25 as in the case of the inner cylindrical leg 16. There are sets of holes in inner cylindrical leg section 20 along the length thereof as in leg 16 which can be aligned with holes 24 into which pin 25 is inserted to secure leg 20 therewith. A guard 26 is mounted on section 21 over the pin 25. The pin is inserted in the holes in the legs as shown in FIGS. 6 and 7.

Figure 4:
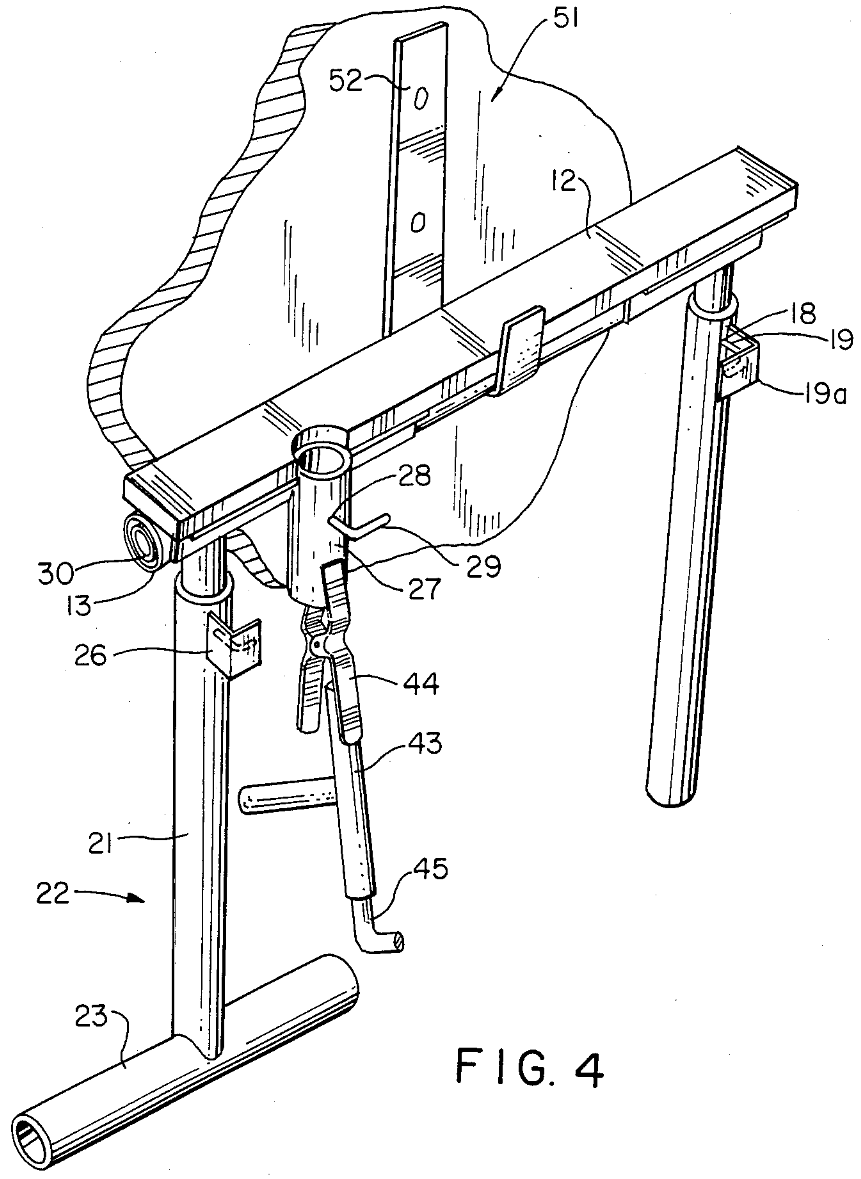
FIG. 4 shows the stand in the stored position on a wall.
Figure 5:
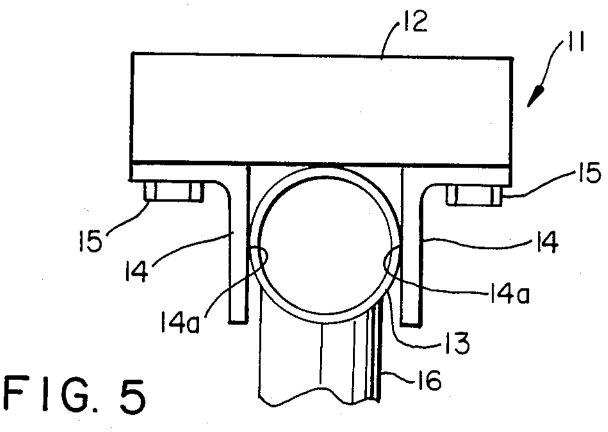
FIG. 5 shows an end view of the platform support section of the portable stand.

A second hole 27 is located at the top of leg section 21 90° from hole 24, the purpose of which will be discussed in more detail in connection with FIG. 4.

Mounted on the bracket 14 under tube member 13 near the end of the platform section under which the T-shaped member is located is sleeve 27 having hole 28 into which screw clamp 29 is threaded. A semi-spherical section is cut out of the platform member 12 to accommodate the sleeve. Slidably mounted within the sleeve 27 is tubular upright member 30 which can be held in any given vertical position by tightening top clamp 29 against it. A spherical cushioned support made from rubber, plastic or the like can be press-fitted over the end of the tubular upright. Thus by adjusting legs 16 and 20 the height of the platform can be changed and by adjusting upright member 30 in sleeve 27 the height of the spherical support can be changed.

Figure 3:
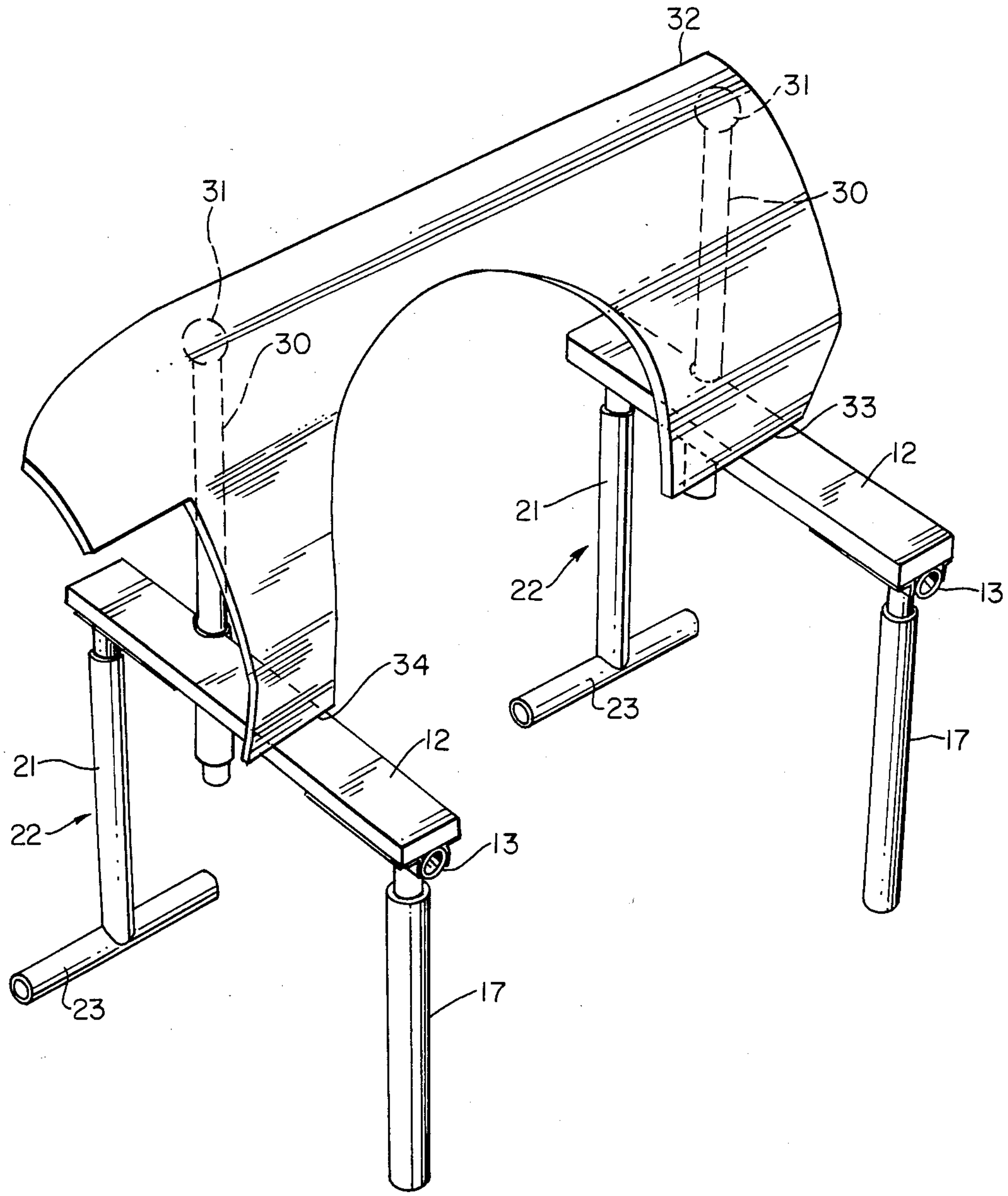
FIG. 3 shows a pair of portable stands according to the invention supporting a fender of an automobile.

FIG. 3 shows a pair of stands according to the invention used to support an automobile fender 32. The horizontal section 23 of T-shaped member 22 and the outer cylindrical leg section 17 of each stand support the stand in a stable condition. The fender 32 is supported at two of its ends 33 and 34 by the platform member 12 of each stand and the inside of the fender is supported by ball supports 31.

Figure 2:
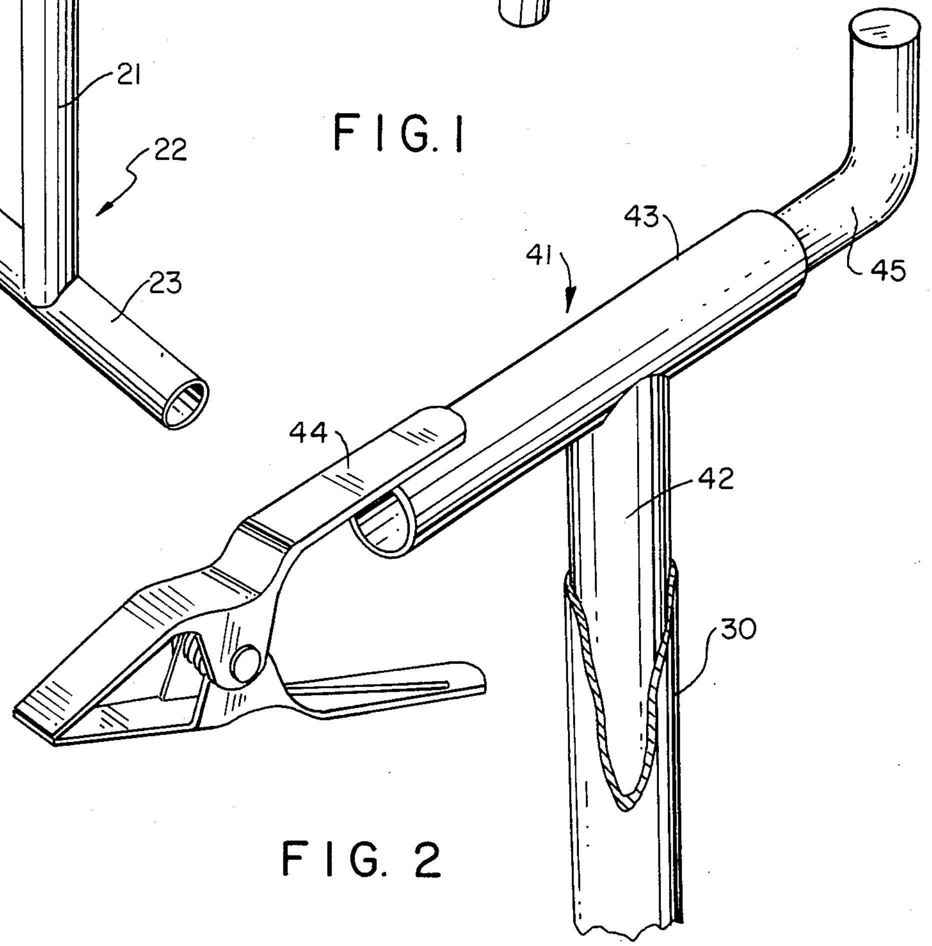
FIG. 2 shows a clamp and support assembly used with the portable stand of the invention.

FIG. 2 shows a further accessory to the stand of the invention which is mountable in upright member 30. The accessory is shown generally by 41 and consists of a tubular T-member in which the shank or vertical member 42 of the T-member is releasably rotatably mounted inside upright member 30. The vertical member 43 has welded at one end thereof a spring clamp 44 and at the-other end hook 45. The clamp 44 allows grasping of a part to be worked on and the hook allows hanging of a part thereon. Of course two stands can be employed using two accessories, if required.

One of the benefits of the stand of the invention is that its components can be assembled in a planar configuration and can be hung on a vertical surface such as a wall or the like for storage. FIG. 4 shows the apparatus so stored on wall 51. To place the stand in the stored position, outer cylindrical leg 17 is raised to its highest position over inner cylindrical leg 16 and pin 19 is inserted through hole 18 and the highest hole in leg 16 to lock the legs. Pin 24 is removed from hole 25 and the top hole of inner cylindrical lmember 20 and T-shaped member 22 is rotated 90° so that hole 27 on section 21 lines up with the top hole of cylindrical member 20. Pin 24 is then inserted therein. This condition places horizontal section 23 in the same plane as platform member 12. Screw clamp 29 is then unthreaded from sleeve 27 and upright member 30 is removed therefrom. Ball support 31 is removed from the upright member and separately stored. Upright member 30 is then slid into tubular support member 13. Clamp 44 of accessory 41 can then be secured to sleeve 27 as shown. The apparatus can then be hung on wall bracket 52 for example by tubular support 13.

The stand is preferably made of metal with the exception that the platform member is preferably comprised of wood. The preferred metal is aluminum due to its lightness. Generally the inner and outer leg members should be about 2 feet long which makes them adjustable to about 4 feet in height. The platform section is about $2\frac{1}{2}$ feet in length and the upright member storable within the tube member 13 is also about $2\frac{1}{2}$ feet long. The horizontal support is about 2 feet in length.

The stand is ideal for making repairs, painting or assembly of automobile body parts as in an automobile body repair shop although the stand need not be so limited. It has the advantage that it can be height-adjusted to accommodate the convenience of the user and the size and shape of the workpiece permits support of the workpiece without clamps. See FIG. 3 for example. This allows a workpiece to be pointed for example without having accessories covering part of the surface. It has particular advantages when used in pairs. The accessory described above is ideal for holding small workpieces at a desired height and of course another important feature of the invention is that the stand can be partially disassembled and stored as a self-contained unit on a wall for example.

I claim:

1. An apparatus for supporting a workpiece comprising;

(a) a platform member;

(b) a first and second inner leg mounted under said platform member;

(c) a first outer leg slidably adjustable over said first inner leg;

(d) a T-shaped member having an outer leg section and a horizontal support section, said outer leg section being slidably mounted over said second inner leg, said horizontal support section being rotatably adjustable and locked to a position coplanar with said platform member;

(e) an upright member slidably mounted and vertically adjustable on said platform member and storable under said platform member;

(f) a support member releasably mounted on said upright member;

(g) clamp means mounted on said support member; and (h) hook means mounted on said support member.

2. An apparatus for holding a workpiece comprising:

(a) a platform section having a flat platform member and a tubular member mounted under said platform member;

(b) a first inner cylindrical leg having first holes therein disposed at intervals along the length thereof;

(c) a first outer cylindrical leg slidably mounted over said first inner cylindrical leg having a hole located at the top thereof for communication with any of said first holes of said first inner leg;

(d) a second inner cylindrical leg having second holes therein disposed at intervals along the length thereof;

(e) a T-shaped member having a second outer cylindrical leg slidably mounted over said second inner cylindrical leg having a third hole therein located at the top thereof and a fourth hole located at the top thereof 90° from said third hole, and a horizontal support member;

(f) pin means for locking said first inner leg to said first outer leg and said second inner leg to said second outer leg, said T-shaped member being rotatable so that said horizontal member occupies a position coplanar with said platform section and lockable in said position by said pin means inserted through a second and said fourth holes;

(g) a cylindrical sleeve having clamp means mounted on said platform section; and (h) a tubular upright section slidably fittable in said sleeve and retainable by said clamp means, said tubular section being storable within said tubular member;

(i) a cylindrical support member slidably releasably mounted in said tubular upright section;

(j) clamp means mounted on said support member; and (k) hook means mounted on said support member.

* * * * *